United States Patent [11] 3,620,966

[72] Inventors Stanley C. Haney;
 Robert N. Cimbalo, both of Homewood, Ill.
[21] Appl. No. 15,829
[22] Filed Mar. 2, 1970
[45] Patented Nov. 16, 1971
[73] Assignee Atlantic Richfield Company
 New York, N.Y.

[54] METHOD HIGH SPACE VELOCITY HYDROGENATION OF OLEFINS
 10 Claims, No Drawings

[52] U.S. Cl. .................................................... 208/143,
 208/144, 208/14
[51] Int. Cl. ................................................ C10g 23/04
[50] Field of Search ........................................ 208/143,
 144, 14; 260/683.9

[56] References Cited
 UNITED STATES PATENTS
 3,053,915 9/1962 King .......................... 208/143

| 3,098,882 | 7/1963 | Arnold .......................... | 208/143 |
| 3,310,485 | 3/1967 | Bercik et al .................. | 208/143 |
| 3,412,169 | 11/1968 | Clark ............................ | 208/143 |
| 3,539,500 | 11/1970 | Brooks et al .................. | 208/143 |

*Primary Examiner*—Herbert Levine
*Attorneys*—Thomas J. Clough, Blutcher S. Tharp and Frank J. Uxa ABSTRACT: A method for the manufacture of odorless paraffinic solvents having a high degree of saturation is disclosed. The method of the present invention involves contacting an olefinic hydrocarbon feedstock of solvent boiling range with hydrogen at high space velocities in the presence of a catalyst containing platinum or a platinum-type metal and alumina to produce a product having no more than 5 percent by volume olefinic unsaturation. The alumina component of the catalyst can be derived from a precursor hydrous alumina in which crystalline trihydrate predominates.

METHOD HIGH SPACE VELOCITY HYDROGENATION OF OLEFINS

The present invention relates to a method for the manufacture of odorless paraffinic solvents. More particularly, the present invention relates to a method for the manufacture of odorless paraffinic solvents having no more than 5 volume percent of olefinic components, the hydrogenation of an olefinic feedstock in the presence of a platinum on alumina catalyst.

Various methods are known in the art for hydrogenating aliphatic solvents to reduce the amount of olefinic unsaturation, these methods varying according to the particular solvent being processed and the level of saturation which is required for a particular application. Such a requirement is set forth in Section $k(1)$ of Los Angeles County, Calif., Rule 66, which defines a photochemically reactive solvent as any solvent, a combination of hydrocarbons, alcohols, aldehydes, esters, ethers or ketones, having an olefinic or cyclo-olefinic type of unsaturation which exceeds 5 volume percent. Such solvents include those solvents known as odorless solvent light and odorless solvent heavy, which normally do not contain any significant amounts of aromatics. The various aliphatic hydrocarbon solvents prior to treatment usually contain minor amounts, say about 6 to 15 volume percent of olefinic components as defined in Section $k(1)$ of Rule 66.

The method of the present invention involves contacting such olefinic, aliphatic hydrocarbon feedstocks boiling primarily in the range of about 150° to 500° F., with hydrogen in the presence of a catalyst containing platinum or other platinum group metal on a catalytically active alumina. The reaction conditions include a temperature of about 375° to 600° F., preferably about 400° to 500° F.; a pressure of about 250 to 750 p.s.i.g., preferably about 400 to 550 p.s.i.g.; and a molecular hydrogen-to-hydrocarbon feed ratio of about 150 to 1,000 standard cubic feet per barrel of feed, preferably about 250 to 500 standard cubic feet per barrel of feed.

A particular feature of the method of the present invention is the use of high space velocities. Such space velocities were found to provide a much more economical operation, due to the resulting capability for processing larger quantities of feedstock for a given amount of hydrogen and catalyst while at the same time having no deleterious effect on the product obtained. Typically the weight hourly space velocity (WHSV), weight units of feed introduced into the reaction zone per weight unit of catalyst per hour, will be at least about 15, for instance, in the range of about 15 to 35, preferably about 20 to 30.

The reaction conditions are preferably selected to provide a product which satisfies the unsaturation requirements of Section $k(1)$ of Rule 66 and at the same time to prevent excessive vaporization of the feed which would result in a more expensive operation. Thus the operating conditions selected will usually result in vaporization of from about 5 to 20, preferably about 10 to 20, weight percent of the feed.

The olefinic feedstocks which can be treated in accordance with the present invention contain a minor amount greater than 5 volume percent unsaturated or olefinic hydrocarbons and a minor proportion, often less than about 25 or even less than about 10, volume percent aromatic hydrocarbons, the essential balance of the feedstock being composed of aliphatic saturated hydrocarbons, i.e. paraffins and naphthenes. Suitable stocks include the alkylates and polymers of $C_3$–$C_4$ olefins and paraffins such as, for example, the alkylates of mixtures of butenes and isobutanes. The products obtained by the method of the present invention contain not greater than 5 volume percent olefinic components; preferably there is at least a 2 percent by volume decrease in olefinic components of the product as compared to the initial feedstock.

The hydrogenation catalyst employed in the method of the present invention is composed to a major extent of alumina and a minor, catalytically effective amount of platinum or other platinum group metal such as rhodium and palladium. The alumina support of the catalyst in the present invention often has a surface area of at least about 150 square meters per gram and it is preferred to apply the method of this invention when the support has a surface area of about 350 to 550 or more square meters per gram. The support is preferably composed to a major extent of gamma-family alumina modifications derived by the activation or calcination of alumina trihydrates. These gamma-family alumina modifications include among others, gamma and eta aluminas. U.S. Pat. No. 2,838,444 discloses this type of alumina support having surface areas in the range of about 350 to 550 square meters per gram, while in U.S. Pat. No. 2,838,445 there is described catalyst supports made from predominantly trihydrate alumina precursors, the supports having surface areas in the range of about 150 to 350 square meters per gram. These supports are suitable for use in the present invention, especially the higher area supports of U.S. Pat. No. 2,838,444. As stated, the preferred alumina precursors predominate in trihydrate which may contain one or more of the bayerite, gibbsite or nordstrandite forms, and preferably a major amount of the trihydrate is composed of bayerite or nordstrandite which when calcined can form eta alumina. It is also advantageous that the hydrous alumina precursor contain about 65 to 95 percent of the trihydrate with the essential balance being composed of one or both of the alumina monohydrate, boehmite, or amorphous hydrous alumina.

Preferred supports have pore volume of at least about 0.1 cc./g.; preferably at least about 0.15 cc./g., in pores greater than about 100 A. radius. It is also preferred that the supports have at least about 0.05 cc./g. in pores greater than about 300 A., or even greater than about 600 A. radius. These determinations are by the method described by Barrett, Joyner and Halenda, JACS, 73, p. 373 (1951).

The catalysts employed in the present invention may be prepared by a sequence of operations which comprises: forming an alumina hydrogel; converting the alumina hydrogel, which as formed is a highly gelatinous precipitate composed of a mixture of amorphous gelatinous hydrous oxides that normally dry to boehmite or an amorphous appearing alumina hydrate, to a mixture predominating in crystalline trihydrate; incorporating the platinum or platinum metal-bearing component in the mixture of hydrate phases; drying the resulting slurry; and calcining the dried product by treatment at an elevated temperature. The gamma-family alumina modifications which can be referred to as activated forms of alumina result from the calcination, preferably in an oxygen-containing gas, of the hydrous alumina precursor. Calcination of the catalysts used in this invention can be conveniently conducted at temperatures of the order of about 700° to 1,200° F. or more and this operation can be controlled to give a final catalyst of desired surface area. At an appropriate stage in the manufacture of the catalyst, the particles can be formed into macrosize as distinguished from finely divided or fluidized catalyst types. The macrosize particles frequently have diameters in the range of about one sixty-fourth to three-eighths inch, preferably about one-sixteenth to one-fourth inch, and if not spherical, the particles usually have lengths of about one sixty-fourth to 1 inch or more, preferably about one-eight to one-half inch.

These catalyst compositions often contain about 0.1 to 1 weight percent of platinum or other platinum metal or combination of platinum metals. The form in which the platinum metal can be present in the catalyst is not detectable by X-ray diffraction methods. Thus, if the platinum metal be present as metal crystallites the fact that they are not detectable by X-ray diffraction methods indicates crystallite sizes of less than about 50 angstrom units. Excess platinum metal in forms detectable or undetectable by X-ray diffraction techniques may be present but such an excess has not been found to provide any advantage justifying the expense.

The following examples are illustrative of the method of the present invention:

The feedstock employed in the examples was odorless solvent light, obtained by distilling an isobutane-butylenes alkylate rerun tower bottoms and having the following characteristics:

| | |
|---|---|
| Gravity, °API | 54.0 |
| Bromine Number | 7.0 |
| Sulfur, p.p.m. | 12 |
| Nitrogen, p.p.m. | 8 |
| ASTM Distillation | |
| IBP-10%, °F. | 358-362 |
| 50-90%, °F. | 365-368 |
| 95-FBP, °F. | 372-380 |

This material as produced from the fractionation tower does not meet Section $k(1)$ of Rule 66 as measured by Bromine Number, having an olefin content of about 6.5 percent. A platinum on alumina catalyst (0.6 wt. percent pt.) made in accordance with U.S. Pat. No. 2,838,444, in the amount of 20 grams was charged to a 1-inch isothermal reactor and the above-described feedstock was treated under conditions as shown in table I.

TABLE I
Reaction Conditions and Product Characteristics

| Test Number | 1 | 2 | 3 | 4 | 5 |
|---|---|---|---|---|---|
| Temperature, °F | 600 | 350 | 400 | 450 | 450 |
| Pressure, p.s.i.g | 500 | 500 | 500 | 500 | 500 |
| Weight hourly space velocity | 25 | 25 | 25 | 25 | 15 |
| Hydrogen rate, s.c.f./b | 1,000 | 1,000 | 250 | 250 | 250 |
| Calculated percent feed in reactor in vapor phase | 100 | 16.9 | 7.5 | 14.1 | 14.1 |
| Product characteristics: | | | | | |
| Bromine number | 0.3 | 6.0 | 4.7 | 2.1 | 1.6 |
| Gravity, °API | 54.2 | 54.1 | 54.1 | 54.1 | 54.2 |
| ASTM distillation, °F.: | | | | | |
| IBP-10% | 354-360 | 357-362 | 360-362 | 361-363 | 359-362 |
| 50-90% | 363-368 | 364-368 | 364-367 | 364-368 | 365-368 |
| 90-FBP | 371-377 | 371-378 | 372-378 | 371-378 | 372-378 |

Comparison of tests 1 and 2 shows that at conditions giving complete vaporization, the solvent is essentially completely saturated, and at the lower temperature of 350° F., other conditions being the same, the product does not meet Rule 66 requirements of 5.0 maximum olefinic unsaturation. Test 3, where the temperature is 50° F. above test 2 and hydrogen rate is one-fourth that of tests 1 and 2, gives a product meeting Rule 66 requirements, at a lower percent vaporization than either test 1 or 2. Thus, there is a saving in heat and hydrogen-rich gas requirements and, therefore, gas compression costs. Test 4 where the temperature is 50° F. above test 3 results in about 14.1 percent vaporization and a product well within the requirements of Section $k(1)$ of Rule 66. Test 5 shows the result of lowering space velocity, with other processing conditions being held at the same level as test 4. As can be seen, there is little benefit derived in going to these lower space velocities. Table II shows the effect of operating at different pressures.

TABLE II
Reaction Conditions and Product Characteristics

| Test number | 2 | 7 | 1 | 8 |
|---|---|---|---|---|
| Temperature, °F | 350 | 350 | 600 | 600 |
| Pressure, p.s.i.g | 500 | 750 | 500 | 750 |
| Weight hourly space velocity | 25 | 25 | 25 | 25 |
| Hydrogen, s.c.f./b | 1,000 | 1,000 | 1,000 | 1,000 |
| Calculated percent vapor in reactor | 16.9 | 15.0 | 100 | 100 |
| Product characteristics: | | | | |
| Bromine number | 6.0 | 6.2 | 0.3 | 0.0 |
| Gravity, °API | 54.1 | 54.0 | 54.2 | 54.1 |
| ASTM distillation, °F.: | | | | |
| IBP-10% | 357-362 | 358-362 | 354-360 | 354-359 |
| 50-90% | 364-368 | 363-367 | 363-368 | 362-368 |
| 95-FBP | 371-378 | 372-379 | 371-376 | 377-378 |

The above data indicate little improvement in degree of saturation in using pressures higher than 500 p.s.i.g., although the degree of saturation is significantly increased by increasing the temperature.

It is claimed:

1. A process for the hydrogenation of paraffinic and naphthenic hydrocarbons containing minor amounts greater than 5 percent of olefins to form products having no more than 5 percent of olefinic components and in which about 5 to 20 weight percent of the feedstock is vaporized which comprises contacting an olefinic hydrocarbon feedstock boiling in the range of about 150° to 500° F. and having greater than 5 percent by volume of olefinic components, with hydrogen at a temperature of about 375° to 600° F., a pressure of about 250 to 750 p.s.i.g., and a space velocity of at least about 15 weight units of feed per weight unit of catalyst per hour in the presence of a catalyst having a minor amount of a platinum group metal on alumina.

2. The process of claim 1 wherein the platinum group metal is platinum.

3. The process of claim 1 wherein the alumina is derived by calcination of hydrous alumina predominating in trihydrate.

4. The process of claim 3 wherein the surface area of the catalyst is about 350 to 550 square meters per gram.

5. The process of claim 4 wherein there is at least a 2 percent by volume decrease in olefinic components of the product as compared to the initial feedstock.

6. The process of claim 1 wherein the temperature is about 400° to 500° F., the pressure is about 400 to 550 p.s.i.g. and the space velocity is about 20 to 30 weight units of feed per weight unit of catalyst per hour.

7. The process of claim 6 wherein the platinum group metal is platinum.

8. The process of claim 6 wherein the alumina is derived by calcination of hydrous alumina predominating in trihydrate.

9. The process of claim 8 wherein the surface area of the catalyst is about 350 to 550 square meters per gram.

10. The process of claim 9 wherein there is at least a 2 percent by volume decrease in olefinic components of the product as compared to the initial feedstock.

* * * * *